April 22, 1969

R. MATTHEWS ET AL 3,439,791

MACHINE FOR FEEDING APRICOTS ONE AT A TIME SINGLE
FILE FROM A BULK SUPPLY

Filed April 5, 1967

INVENTORS
RUDOLPH MATTHEWS
ROLAND F. BLAKEWELL
FRANK E. SIMPSON

BY

ATTORNEYS

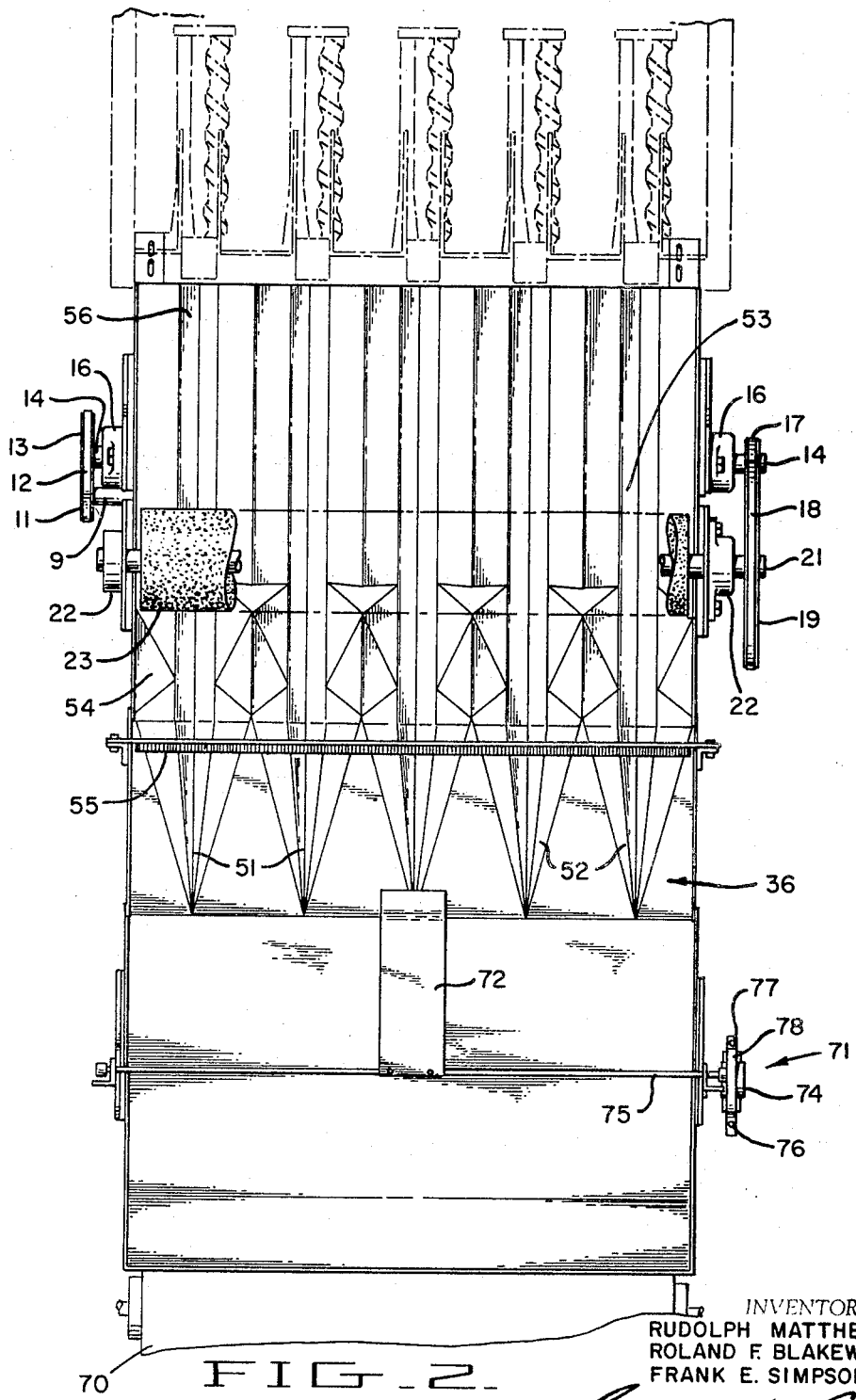
FIG_2

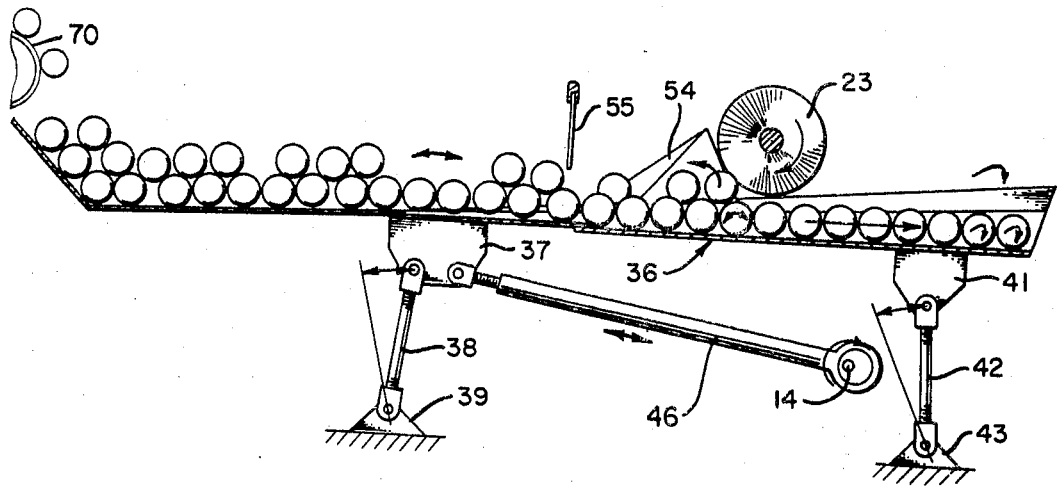
FIG_3_
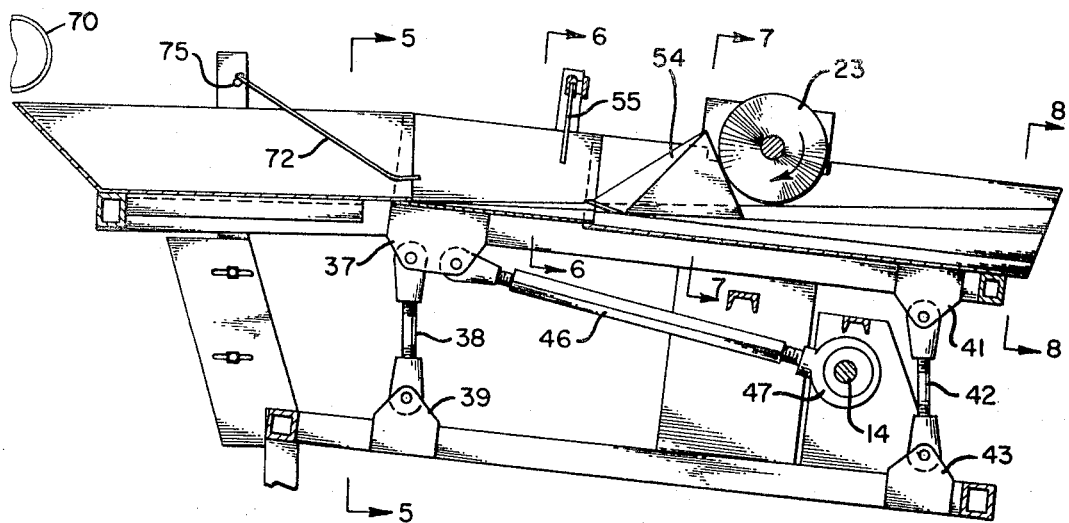
FIG_4_

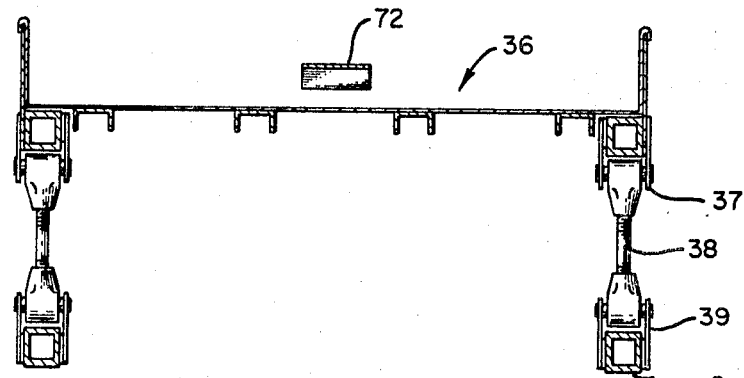
FIG_5_
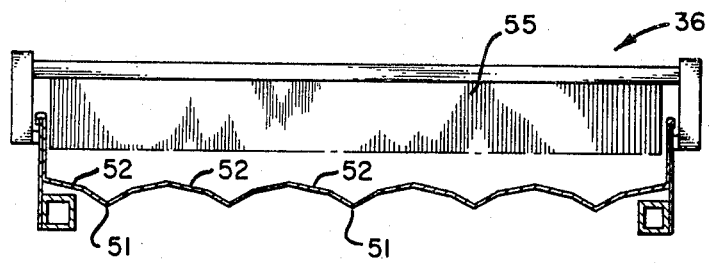
FIG_6_
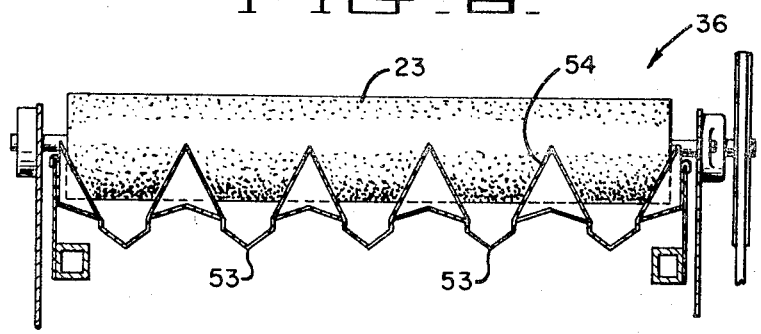
FIG_7_
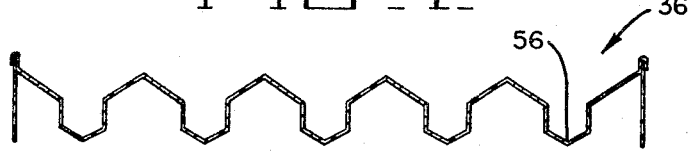
FIG_8_
INVENTORS
RUDOLPH MATTHEWS
ROLAND F. BLAKEWELL
FRANK E. SIMPSON
BY *[signature]*
ATTORNEYS

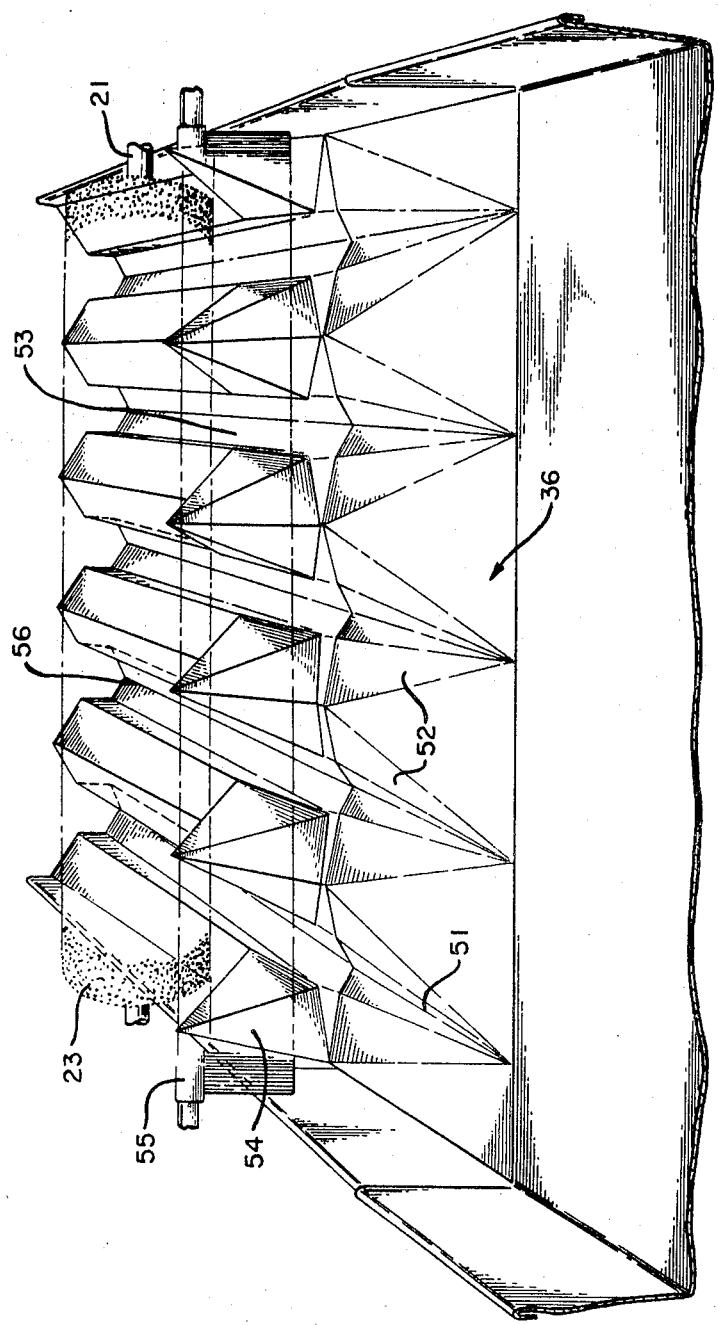
FIG_9
INVENTORS
RUDOLPH MATTHEWS
ROLAND F. BLAKEWELL
FRANK E. SIMPSON
BY
ATTORNEYS

United States Patent Office 3,439,791
Patented Apr. 22, 1969

3,439,791
MACHINE FOR FEEDING APRICOTS ONE AT A TIME SINGLE FILE FROM A BULK SUPPLY
Rudolph Matthews and Roland F. Blakewell, Oakland, and Frank E. Simpson, Castro Valley, Calif., assignors to Atlas-Pacific Engineering Company, a corporation of California
Filed Apr. 5, 1967, Ser. No. 628,659
Int. Cl. B65g 27/08, 27/04
U.S. Cl. 198—33            3 Claims

ABSTRACT OF THE DISCLOSURE

Drupaceous fruit such as apricots are fed in bulk supply to a device in which they are arranged in single file for feed to a feeder mechanism such as is shown in Patent 3,292,768.

Field of the invention

The feeding of fruit from a bulk supply in single file.

Description of the prior art

To feed fruit in multiple rows to a processing machine has been achieved heretofore by a system of belts to which the term "merry-go-round" has been applied. The multiple transfer of fruit from belt-to-belt in such a system is hard on fruit which is characteristically soft such as apricots. Further, such a belt system is expensive to construct and to maintain when feeding only one processing machine.

Summary

It is in general the broad object of the present invention to provide an inexpensive single machine feeder wherein the fruit presented in bulk supply is sorted out and is fed in one or more single file rows to a feeder which in turn feeds the fruit one at a time as to an orientation splitter mechanism such as is shown in Patent 3,272,311.

Another object of the invention is to provide a single filing mechanism which will feed either large or small fruit or fruit of mixed sizes efficiently, that is, without under or overfeeding or damage to the fruit.

The invention includes other objects and features of advantage, some of which, together with the foregoing, will appear hereinafter when the present preferred form of the feeder of this invention is disclosed.

Brief description of the drawings

In the drawings accompanying and forming a part hereof:

FIGURE 2 is a plan view of the machine shown in FIGURE 1;

FIGURE 3 is a view illustrating operation of the machine more or less schematically;

FIGURE 4 is a section taken through the machine and illustrating the construction of a portion of the feed mechanism and the vibrating mechanism and similar to FIGURE 3;

FIGURES 5, 6, 7 and 8 are respectively sections taken along the section lines 5—5, 6—6, 7—7 and 8—8 of FIGURE 4;

FIGURE 9 is a perspective view looking down the table towards its discharge end.

Description of the preferred embodiments

Figure 1:
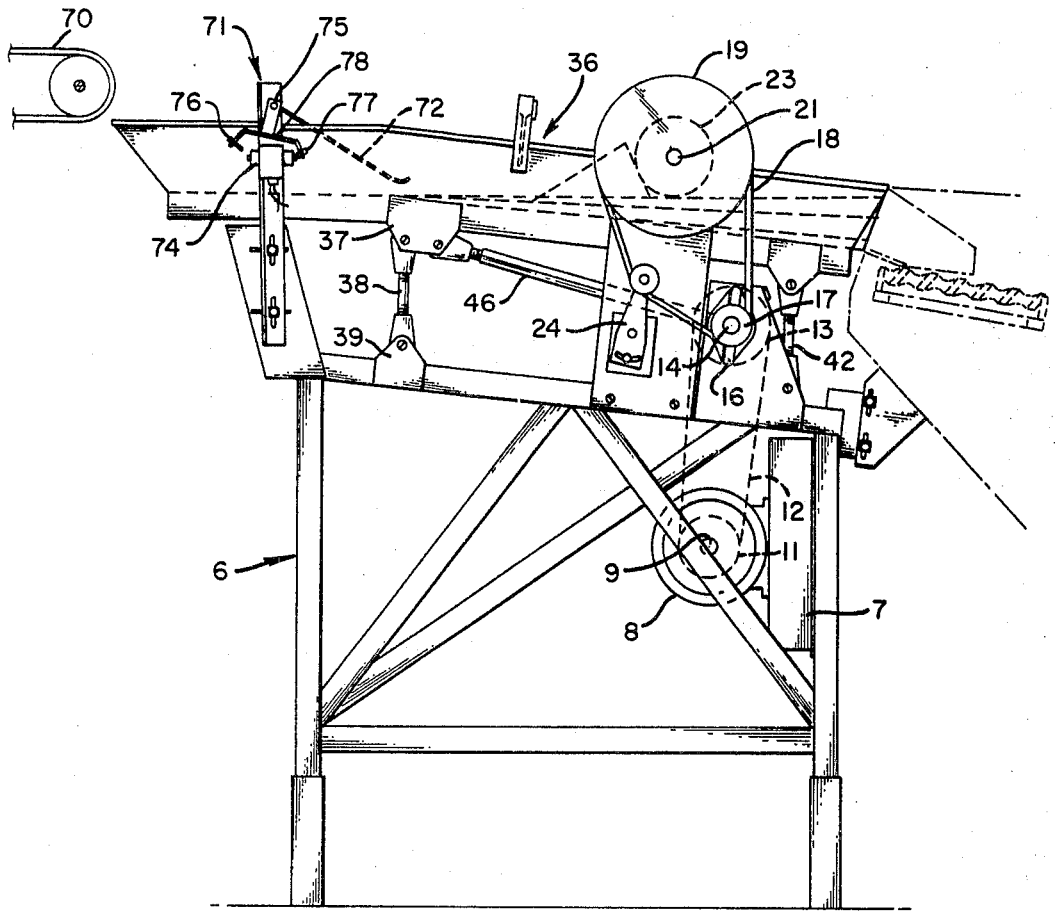
FIGURE 1 is a side elevation of a machine embodying the present invention.

The machine of the present invention includes a suitable frame structure, generally indicated at 6, and made up of suitable structural members providing a frame support for the feeder mechanism of the present invention.

Mounted upon the frame is a base 7 carrying a prime mover 8. The latter includes a shaft 9 having a variable pitch pulley 11 thereon. A belt 12 is trained about the pulley 11 and about a pulley 13 provided upon a shaft 14 which extends transversely on the frame and being mounted thereon in suitable bearings 16 affixed to the frame. A pulley 17 is secured on one end of the shaft 14 and a belt 18 is trained thereover and about a pulley 19 secured upon a shaft 21. The latter is mounted in suitable bearings 22 on opposite sides of the machine and provides support for the shaft 21. Mounted upon the shaft 21 for rotation therewith is a brush 23. The desired tension is maintained in the belt 18 by an adjustable idler structure 24 (FIGURE 1).

Mounted on frame 6 is a reciprocating pan, generally indicated at 36. On opposite sides of the pan and mounted at about one-third the length from the lefthand end of the pan (FIGURES 3 and 4), plates 37 are attached. Adjustable links 38 are pivoted on plates 37 and on base plates 39, the latter being attached to frame 6. On opposite sides near the righthand end of pan 36 plates 41 are attached. Adjustable links 42 are pivoted on plates 41 and base plates 43, the latter also being attached to frame 6.

To reciprocate the pan, adjustable connecting rods 46 are provided, being pivotally connected to plates 37 at one end and attached to eccentrics 47 at their other ends. The eccentrics 47 are mounted on shaft 14 and each has a throw of about ⅜ inch. The shaft 14 is rotated at a speed of from 650 to 1000 r.p.m. which results in the same number of reciprocations of the pan 36. With the pan 36 moved to the right in FIGURE 3, the adjustable connecting rods 46 are set so that the links 42 are substantially vertical. This results in the reciprocation being all to the left of the vertical center, thus introducing a small vertical component of motion to the pan at its righthand end. With this adjustment of the connecting rod, links 38 travel substantially equally on each side of vertical resulting in almost no vertical component in the pan during reciprocation. This configuration of the vertical components results in a light feeding action on the lefthand end of the pan where the fruit is in bulk coupled with a strong feeding action at the righthand end where the fruit is in single file. The slow advance of a single layer results in a fast advance of fruit in the single file channels.

The pan 36 varies in cross section from left to right (FIGURE 4) as appears in the sectional views in FIGURES 5–8. Fruit is fed in bulk to the lefthand planar end of the pan, as shown in FIGURE 5. This end of the pan is either level or has a slight downward pitch toward the pan section shown in FIGURE 6. This spreads the fruit laterally so that the fruit is usually only a layer deep at the start of the series of valleys 51 between elevated ridges 52. The crests of the ridges 52 remain substantially level while the valley bottoms pitch downwards about one inch per foot, thus becoming deeper from left to right (FIGURE 4). This deepening urges the fruit to seek the valleys and avoid the ridges. Fixed brush 55 is supported on the sides of pan 36 and extends across the pan and is adjustable for height to assist in holding back any second layers of fruit riding on the layer beneath.

At section 7 (FIGURE 7) pyramid-shaped elements 54 rise abruptly to more strongly urge the fruit into a single file which may become more than one layer deep. Rotating brush 23 turns at about 200 r.p.m. in a clockwise direction (FIGURE 4) at the downstream side of elements 54 to hold back the upper layers of fruit which may develop in valleys 53 at this point. Thus, only a single layer of fruit in the bottom of each of the valleys 53 can pass brush 23 and enter into the deep trough 56 (FIGURE 8). Thus, the bulk supply is channelized into several single file rows of an appropriate spacing to feed such a machine, as shown in Patent 3,272,311.

The links 38 and 42 are adjustable so that the downward pitch of pan 36 can be adjusted to suit the existing conditions so that underfeeding or overfeeding may be controlled. The bulk supply to the lefthand planar end (FIGURE 4) is from a conveyor belt 70. Further to prevent the bulk supply from becoming excessive, the movement of the conveyor 70 is controlled by a switch mechanism, generally indicated at 71. The switch mechanism includes a hinged leaf 72 which is lifted if the fruit becomes more than one layer deep. As the fruit depth increases, switch 74 is opened by the pressure of screw 76 on arm 78 which is pivoted with leaf 72 about shaft 75. The opening of switch 74 turns off the current supply to a motor (not shown) which drives the conveyor, thus stopping the incoming flow of fruit. When the level of fruit drops to one layer deep, screw 77 on arm 78 (FIGURE 1) closes the switch causing the conveyor to begin feeding fruit into the planar section of the pan 36.

We claim:
1. A device for feeding fruit in single file order comprising:
   (a) a table having a supporting surface over which fruit flows from an inlet end to an outlet end; said table having a substantially planar receiving portion, a fruit-aligning portion sloping downwardly from the receiving portion and including a series of spaced parallel grooves extending toward said discharge end, a continuing plurality of substantially V-shaped grooves, and a final series of communicating U-shaped grooves for receiving fruit and finally discharging the same at the outlet end;
   (b) means for supporting said table at each end as to position the supporting surface of the table at an angle relative to the horizontal, said surface sloping toward the discharge end of said table;
   (c) said supporting means comprising a pivoted link at the receiving end of the table supporting the receiving end of the table for movement over a substantially level path, and a pivoted link at the discharge end of the table supporting the discharge end of the table for movement over an appreciable change in elevation from one end of the path to the other end of the path; and
   (d) means for reciprocating the table.

2. A device as in claim 1 wherein means are provided for preventing fruit to flow from the inlet end to the outlet end in a depth in excess of a single fruit.

3. A device as in claim 1 wherein means are provided to deliver fruit to the table and control means operate to control the fruit delivery means to deliver only a volume of fruit which the device can place in single file order.

References Cited

UNITED STATES PATENTS

| | | |
|---|---|---|
| 1,447,507 | 3/1923 | Becker. |
| 2,337,394 | 12/1943 | Kok. |
| 2,832,459 | 4/1958 | Lauer. |
| 3,273,615 | 9/1966 | Aquilar. |

RICHARD E. REGERTER, *Primary Examiner.*

U.S. Cl. X.R.
198—220